(12) United States Patent
Fetzmann et al.

(10) Patent No.: US 7,710,261 B2
(45) Date of Patent: May 4, 2010

(54) METHOD AND DEVICE FOR DISPLAYING PART OF AN AIRPORT ON A VIEWING SCREEN

(75) Inventors: Fabien Fetzmann, Cugnaux (FR); Pierre Coldefy, Toulouse (FR); Stephane Collins, Toulouse (FR)

(73) Assignee: AIRBUS France, Toulouse (FR)

( * ) Notice: Subject to any disclaimer, the term of this patent is extended or adjusted under 35 U.S.C. 154(b) by 260 days.

(21) Appl. No.: 11/910,505

(22) PCT Filed: Mar. 28, 2006

(86) PCT No.: PCT/FR2006/000665
§ 371 (c)(1),
(2), (4) Date: Oct. 2, 2007

(87) PCT Pub. No.: WO2006/106206
PCT Pub. Date: Oct. 12, 2006

(65) Prior Publication Data
US 2009/0121900 A1    May 14, 2009

(30) Foreign Application Priority Data
Apr. 4, 2005    (FR) .................................. 05 03268

(51) Int. Cl.
*G08B 1/08* (2006.01)
(52) U.S. Cl. .................. 340/539.11; 700/200; 700/214
(58) Field of Classification Search . 340/995.1–995.28, 340/988, 999; 701/200, 214
See application file for complete search history.

(56) References Cited
U.S. PATENT DOCUMENTS
6,565,610 B1    5/2003    Wang et al.

| | | | |
|---|---|---|---|
| 6,694,249 B1* | 2/2004 | Anderson et al. | 701/120 |
| 7,117,089 B2* | 10/2006 | Khatwa et al. | 701/301 |
| 7,555,372 B2* | 6/2009 | Dwyer | 701/16 |
| 7,567,187 B2* | 7/2009 | Ramaiah et al. | 340/945 |
| 2004/0006412 A1* | 1/2004 | Doose et al. | 701/10 |
| 2005/0187711 A1* | 8/2005 | Agrawala et al. | 701/211 |
| 2005/0190079 A1* | 9/2005 | He | 340/945 |

FOREIGN PATENT DOCUMENTS

| | | |
|---|---|---|
| WO | 01/71465 | 9/2001 |
| WO | 02/129726 | 4/2002 |
| WO | 03/071228 | 8/2003 |

OTHER PUBLICATIONS

PCT International Search Report dated Jul. 3, 2006.

* cited by examiner

*Primary Examiner*—Davetta W Goins
*Assistant Examiner*—Edny Labbees
(74) *Attorney, Agent, or Firm*—Dickinson Wright PLLC

(57) ABSTRACT

A presentation device includes a searching device that searches for elements of an airport that are displayed on a display field of a screen. A verification device verifies, for each of the elements, whether the element forms part of a first group for which a main anchoring point is located inside a label zone or a second group for which the main anchoring point is located outside the label zone. A determining device determines, for the elements of the second group, a secondary anchoring point located at an intersection between an axis of the element and the label zone. For each element, a label for the element is presented on a screen. The labels associated with the first group are located at the main point and those associated with the second group are located at a secondary anchoring zone.

11 Claims, 4 Drawing Sheets

METHOD AND DEVICE FOR DISPLAYING PART OF AN AIRPORT ON A VIEWING SCREEN

FIELD OF THE INVENTION

The present invention relates to a method and a device for displaying at least one part of an airport comprising a plurality of elements on a display field of a viewing screen.

Although not exclusively, said viewing screen is situated more particularly in the flight deck of an airplane taxiing on the airport, and it is intended to help the pilot of said airplane during airport navigation. The elements capable of being displayed on the viewing screen relate in particular to the various travelways of the airport, such as runways, taxiways or access linkways. Of course, it may also involve other elements such as buildings for example.

SUMMARY OF THE INVENTION

According to the invention, said method of displaying at least one part of an airport (comprising a plurality of elements) on a display field of a viewing screen, is noteworthy in that the following series of successive steps is carried out in an automatic and repetitive manner:

a) a search is conducted for the set of elements of the airport which are displayed on said display field of the viewing screen;

b) for each of the elements found in step a), a check is carried out to verify whether it forms part:
   of a first group for which a main anchoring point, associated with the element and situated on the latter, lies inside a label zone which is defined inside said display field of the viewing screen; or
   of a second group, for which the associated main anchoring point is situated outside said label zone;

c) for all the elements of the second group, an auxiliary anchoring point which is situated at the intersection point between a central axis of said element and said label zone is determined each time; and d) for each of the elements found in step a), an associated label which comprises information relating to said element is presented on said display field of the viewing screen, the labels associated with said elements of the first group being situated at the corresponding main anchoring point, and the labels associated with said elements of the second group being situated at the corresponding auxiliary anchoring point.

Thus, by virtue of the invention, each element of the airport which is situated in the display field of the viewing screen, that is to say which is actually displayed, is furnished with a label which comprises information relating to said element, for example the name of this element, thereby making it possible to render particularly readable and comprehensible the display carried out on said viewing screen. Preferably, said viewing screen is a screen of a flight deck of an airplane and therefore makes it possible to help the pilot to locate himself easily on the airport, during the taxiing of said airplane. However, said viewing screen can also be at the disposal of other operators, and in particular be mounted on any type of vehicle intended to travel around on the airport, such as a service or maintenance vehicle for example.

Moreover, by virtue of the invention, for each element displayed:
   the label is situated at the main anchoring point, if the latter lies inside the label zone which is defined inside the display field of the viewing screen, and preferably in proximity to the edges of said display field. Furthermore, said main anchoring point is situated, preferably, at the center of the corresponding element; and
   if the main anchoring point does not lie inside said label zone, the label is situated at an auxiliary anchoring point which is positioned on the label zone, that is to say at the periphery of the display field.

These characteristics make it possible, on the one hand, always to present a label for each displayed element, even if the corresponding main anchoring point is situated outside the label zone and, on the other hand, not to excessively overload the display field, since the labels of the elements of the second group are situated on the label zone which is preferably defined at the periphery of the display field (inside the latter).

It will be noted that, during the movement of that part of the airport which is displayed and therefore during the movement of said elements on the display field, each label relating to an element of the second group moves along this element, while remaining on the edges of the label zone, doing so until the main anchoring point enters said label zone. Onwards of this instant, the label attaches itself to said main anchoring point, doing so for as long as the latter remains inside said label zone of said viewing screen.

In an advantageous manner, in the event of double intersection between the central axis of an element and the label zone, the intersection point which is situated longitudinally nearest the center of said element, that is to say which is situated nearest the main anchoring point, is determined as auxiliary anchoring point.

Furthermore, advantageously, if the angle between the central axis of an element and the horizontal is greater than a predetermined value, for example 80°, the presentation of the label corresponding to step d) is removed. Moreover, in an advantageous manner, in said step d), each label is presented horizontally.

The present invention also relates to a device for displaying at least one part of an airport (comprising a plurality of elements) on a display field of a viewing screen.

According to the invention, said device is noteworthy in that it comprises:
   first means for searching for the set of elements of the airport which are displayed on said display field of the viewing screen;
   second means for verifying, for each of the elements found by said first means, whether it forms part:
      of a first group for which a main anchoring point, associated with the element and situated on the latter, lies inside a label zone which is defined inside said display field of the viewing screen; or
      of a second group, for which the associated main anchoring point is situated outside said label zone;
   third means for determining each time, for all the elements of the second group, an auxiliary anchoring point which is situated at the intersection point between a central axis of said element and said label zone; and
   fourth means for presenting, on said display field of the viewing screen, an associated label which comprises information relating to said element, the labels associated with said elements of the first group being situated at the corresponding main anchoring point, and the labels associated with said elements of the second group being situated at the corresponding auxiliary anchoring point.

In a particular embodiment, said device comprises, moreover, a means for deactivating the presentation of a label associated with an element, which presentation is implemented by said fourth means, when the angle between the central axis of said element and the horizontal is greater than a predetermined value.

The present invention also relates to a display system of the type comprising:
- a cartographic database of the airport;
- actuation means allowing an operator to control a plurality of functions of said display system; and
- a display device capable of displaying at least one part of the airport on a viewing screen.

According to the invention, this display system is noteworthy in that said display device is of the type of that specified above.

BRIEF DESCRIPTION OF THE DRAWINGS

The figures of the appended drawing will clearly elucidate the manner in which the invention may be embodied. In these figures, identical references designate similar elements.

DETAILED DESCRIPTION OF THE INVENTION

Figure 1:
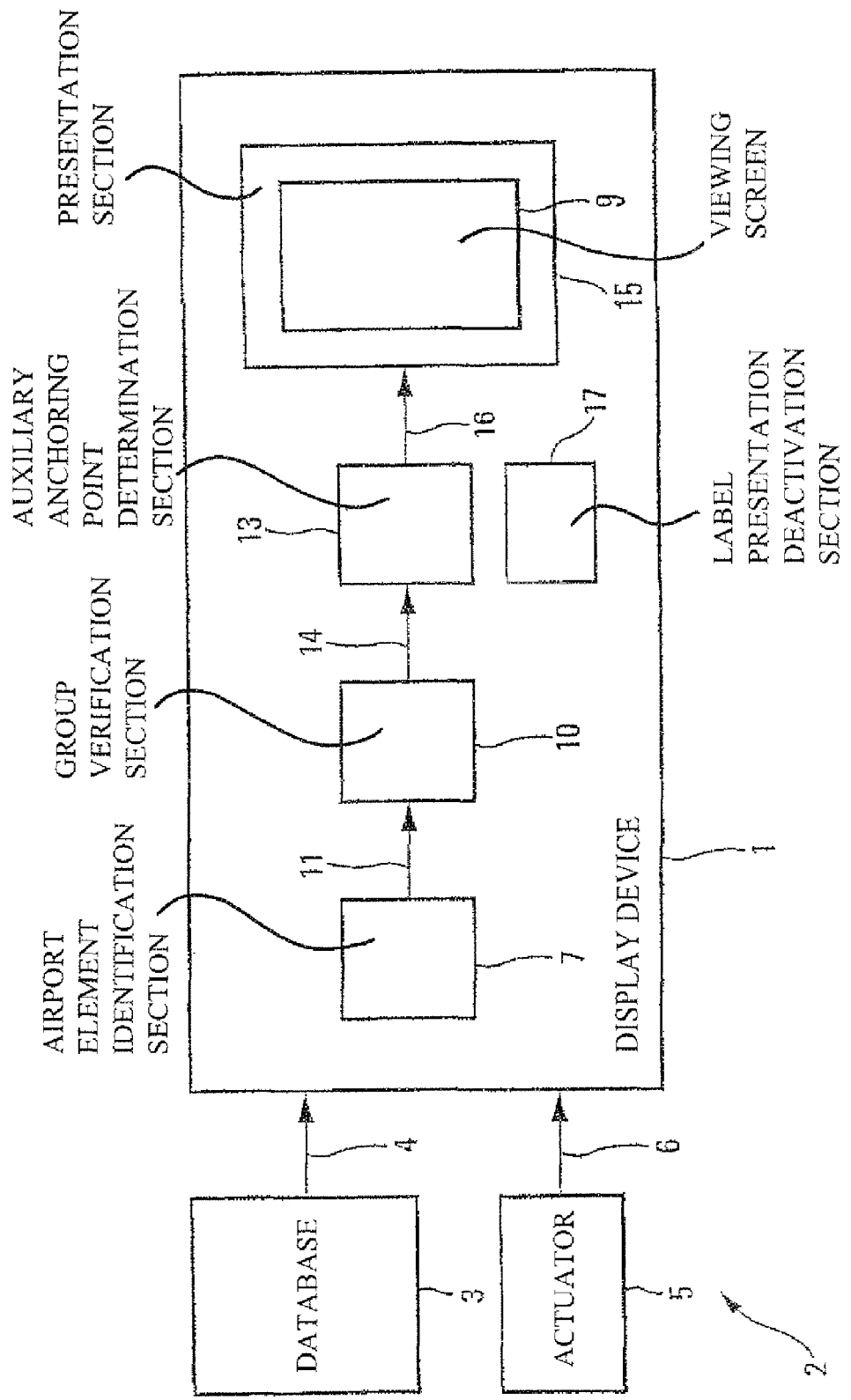
FIG. 1 is the schematic diagram of a display device in accordance with the invention.

The device 1 in accordance with the invention and diagrammatically represented in FIG. 1 is a device for displaying at least one part of an airport which comprises a plurality of elements Ei (i being an integer), in particular travelways (for example runways, taxiways, access linkways, etc.) or buildings of the airport.

This display device 1 can form part of a display system 2, of customary type, which moreover comprises:
- a database 3 which contains cartographic data, of digital type, of said airport and which is connected by a link 4 to said display device 1; and
- customary actuation means 5, which are connected by a link 6 to said display device 1 and which allow an operator to control a plurality of customary functions (switch on/off, zoom, etc.) of said display system 2.

According to the invention, said display device 1 comprises:
- means 7 for identifying the set of elements Ei of the airport, which are displayed at the current instant on the display field 8 (bounded by edges 8A, 8B, 8C, 8D in FIG. 2) of a viewing screen 9 of said display device 1, that is to say the set of elements Ei which are situated in the airport part actually displayed on said display field 8;
- means 10 which are connected by a link 11 to said means 7, for verifying, for each of the elements Ei found by said means 7, whether it forms part:
  - of a first group G1 for which a main anchoring point P1 specified below, which is associated with the element Ei and which is situated on the latter, lies inside a label zone 12 specified hereafter, which is defined inside said display field 8 of the viewing screen 9; or
  - of a second group G2 for which the main anchoring point P1 associated with said element Ei is situated outside said label zone 12;
- means 13 which are connected by a link 14 to said means 10, for determining each time, for all the elements Ei of said second group G2, an auxiliary anchoring point P2 which is situated at the intersection point between a central axis Ai of said element Ei and said label zone 12.

Figure 2:
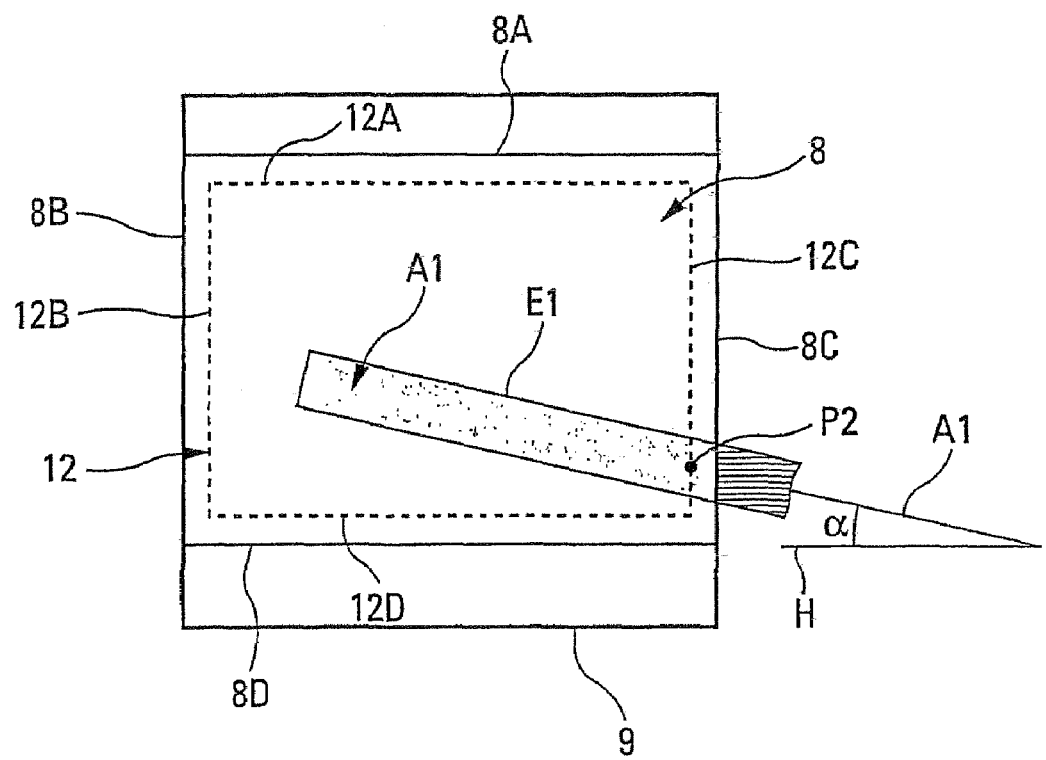
FIGS. 2 to 5 diagrammatically illustrate various display examples, which make it possible to clearly set forth the essential characteristics of the present invention.

In FIG. 2, the auxiliary anchoring point P2 is situated at the intersection of the central axis A1 of the element E1 and of an edge 12C of the label zone 12; and
- means 15 which are connected by a link 16 to said means 13, for presenting on said display field 8 of the viewing screen 9, for each element Ei found by the means 7, an associated label Li, which comprises information relating to the corresponding element Ei and which is, preferably, displayed horizontally whatever the orientation of said element Ei.

Figure 4:
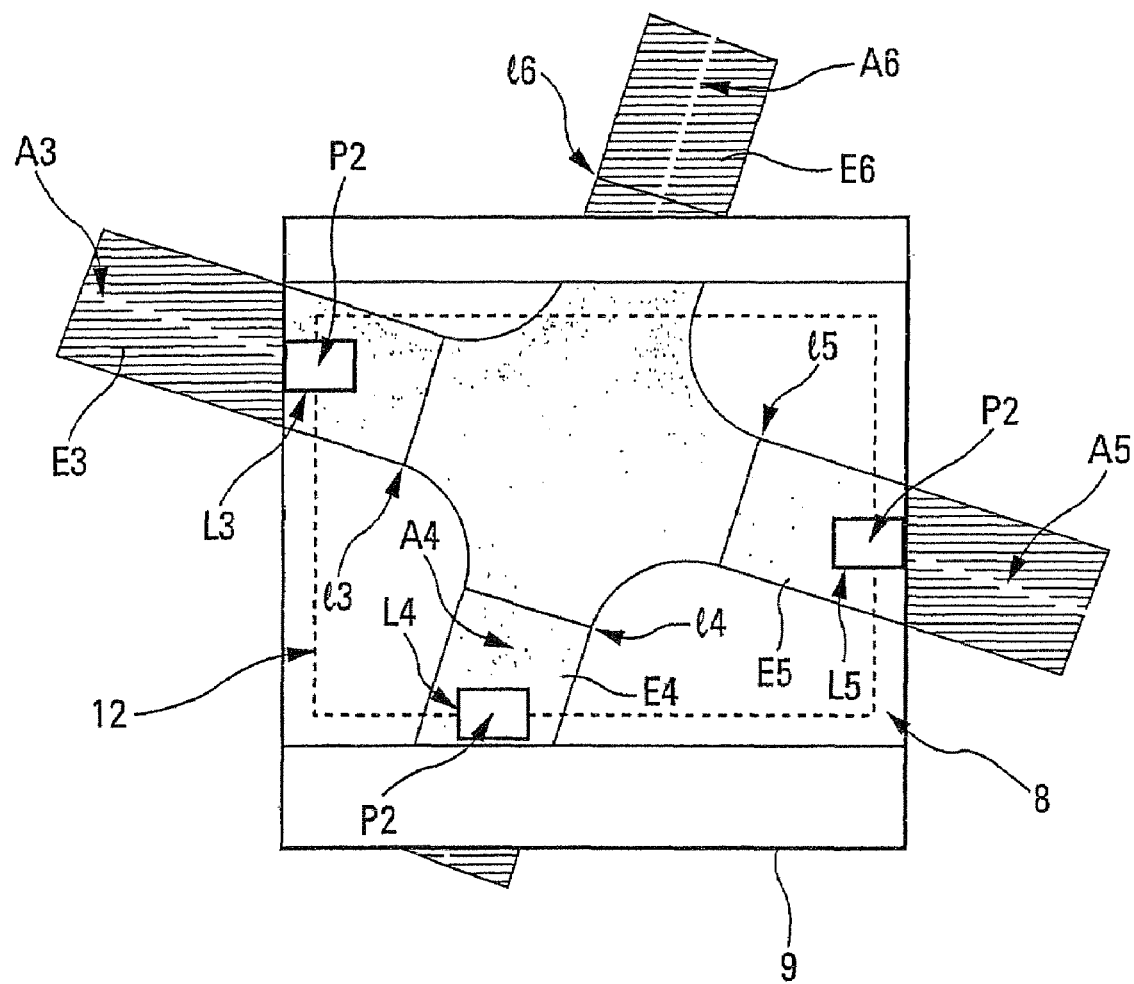
Figure 5:
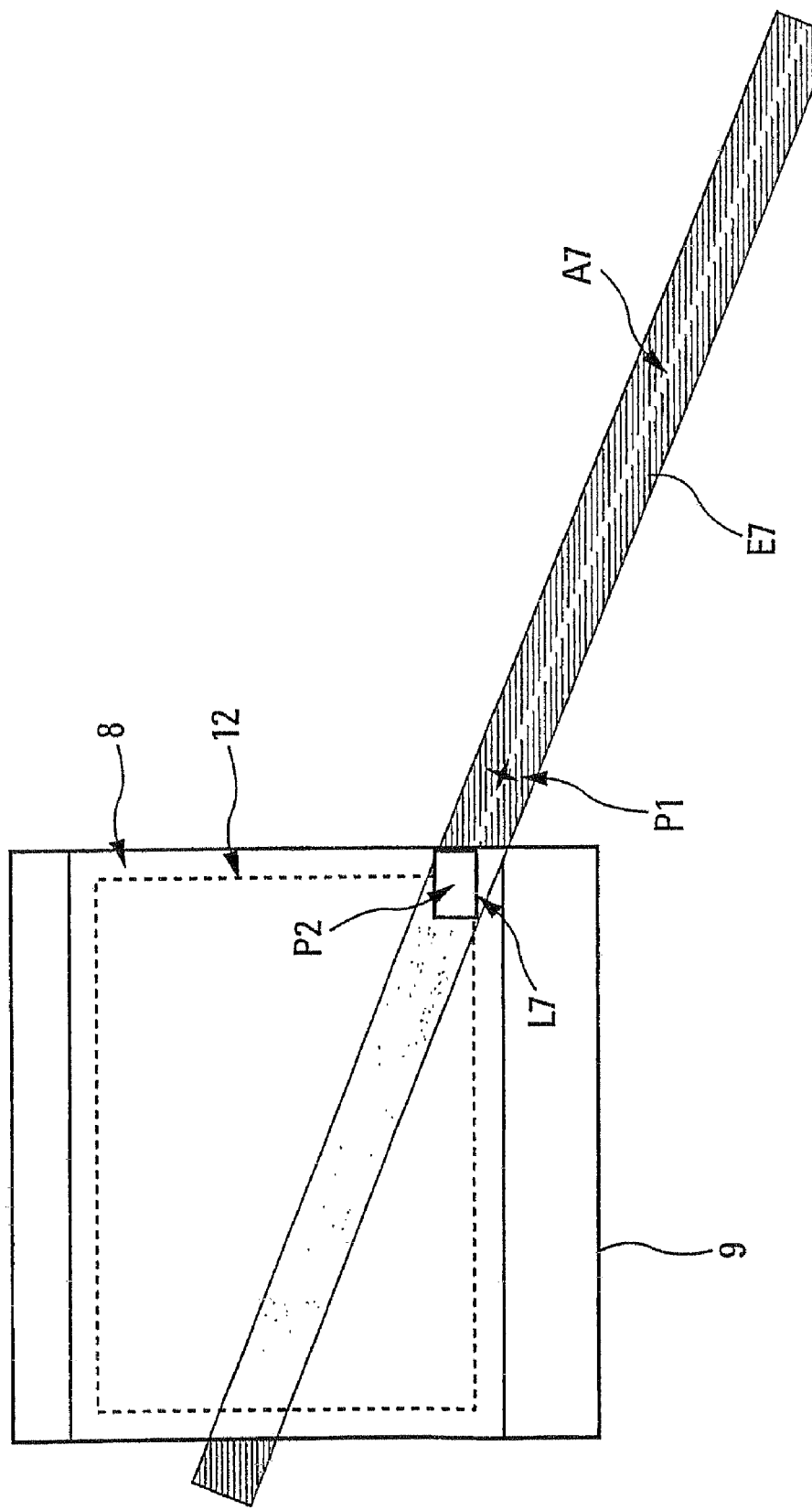

According to the invention, the labels Li associated with the elements Ei of the first group G1 are situated at the corresponding main anchoring point P1, and the labels Li associated with the elements Ei of the second group G2 are situated at the corresponding auxiliary anchoring point P2, as represented for example in FIGS. 4 and 5 for the labels L3, L4, L5 and L7.

Thus, by virtue of the display device 1 in accordance with the invention, each element Ei of the airport which is situated in the display field 8 (or as a variant, in the label zone 12) of the viewing screen 9, that is to say which is actually displayed, is furnished with a label Li which comprises information relating to said element Ei, for example the name of this element Ei, thereby making it possible to render particularly readable and comprehensible the display carried out on said viewing screen 9, since each displayed element E1 can thus be easily identified.

In a preferred embodiment, said viewing screen 9 is a screen of a flight deck of an airplane and thus makes it possible to help the pilot to locate himself (easily) on the airport, during the taxiing of said airplane. However, said viewing screen 9 can also be at the disposal of other operators, and in particular be mounted on any type of vehicle intended to travel around on the airport, in particular a service vehicle or a maintenance vehicle.

Furthermore, as indicated previously:
- a label Li is situated at the main anchoring point P1 if the latter lies inside the label zone 12. The latter is defined inside the display field 8, in proximity to its edges 8A, 8B, 8C and 8D, and preferably so that the distances between the edges 12A, 12B, 12C and 12D of the label zone 12 and the opposite edges 8A, 8B, 8C and 8D of the display field 8 correspond to identical distances, of small value. Furthermore, according to the invention, the main anchoring point P1 is situated, preferably, at the center of the corresponding element Ei, as represented for example in FIG. 5 for an element E7; and
- if the main anchoring point P1 does not lie inside said label zone 12, the label Li is situated on an auxiliary anchoring point P2 which is positioned on the label zone 12, that is to say at the internal periphery of the display zone 8.

The latter characteristics make it possible:
- on the one hand, always to present a label Li for each displayed element Ei, even if the corresponding main anchoring point P1 is situated outside the label zone 12; and
- on the other hand, not to excessively overload the display field 8, since the labels Li of the elements of the second group G2 are situated on the label zone 12 which is preferably defined at the periphery of the display field 8 (inside the latter), thereby freeing the central part of the display field 8.

As indicated previously, FIG. 2 illustrates the determination of an auxiliary anchoring point P2 which is situated at the intersection between the central axis A1 of the element E1 (found by the means 7) and the edge 12C of the label zone 12. In this example, the main anchoring point (not represented) is situated outside the label zone 12. The label (also not represented) which is associated with this element E1 of the airport will therefore be positioned at said auxiliary anchoring point P2.

Figure 3:
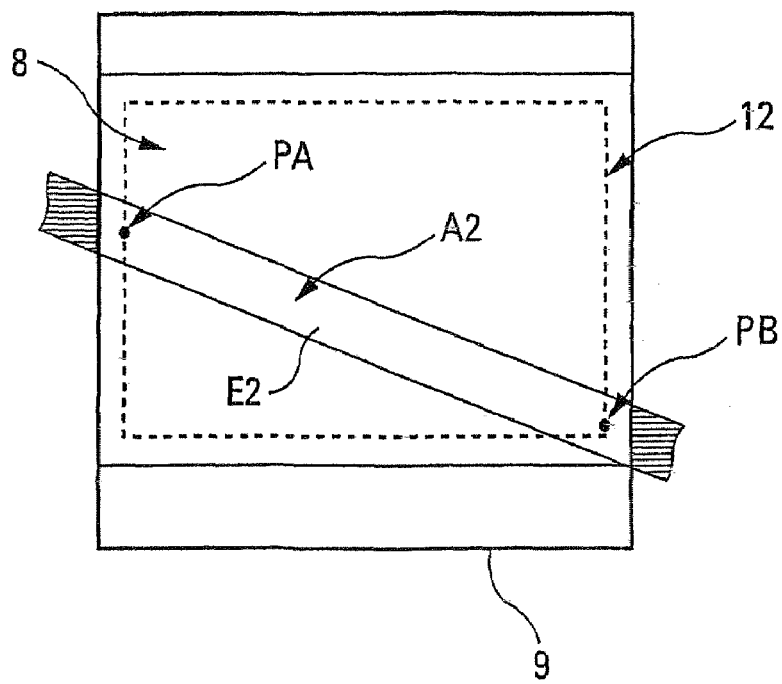

In FIGS. 2 to 4 have been represented for clarity reasons:
- by horizontal hatching, the parts of the elements Ei which are situated outside the display field 8 and which are not therefore displayed in reality; and
- by gray areas, the parts of the elements Ei which lie inside the display field 8 and which are therefore actually viewed at the current instant on the viewing screen 9.

During the determination of an auxiliary anchoring point P2, in the event of double intersection between the central axis A2 of an element E2 and the label zone 12, as represented in FIG. 3, the auxiliary anchoring point P2 corresponds to the intersection point PA, PB which is situated longitudinally nearest the center of said element E2, that is to say which is situated nearest the main anchoring point P1 (not represented) of this element E2.

In the example of FIG. 4, four elements E3, E4, E5 and E6 of the airport which start respectively at ends 13, 14, 15 and 16 are considered. However, only the elements E3, E4 and E5 are situated inside the label zone 12 and the display field 8, the element E6 being completely outside said display field 8, so that only the labels L3, L4 and L5 are displayed, respectively each time at the corresponding auxiliary anchoring point P2.

It will be noted that according to the invention, during the movement of that part during the airport which is displayed and therefore during the movement of the elements Ei on the display field 8, each label Li associated with an element Ei of the second group G2 (such as the label L7 which is associated with the element E7 in FIG. 5) moves along this element Ei, while remaining on the edges of the label zone 12, doing so until the main anchoring point P1 enters said label zone 12. Onwards of this instant, the label Li attaches itself to said main anchoring point P1 and follows it, doing so for as long as the latter lies inside said label zone 12.

Additionally, in a particular embodiment, the display system 1 comprises, moreover, a means 17 which is formed so as:
- to compare the angle $\alpha$ between the central axis Ai of an element Ei and the horizontal H, as represented in FIG. 2 for the central axis A1, with a predetermined limit value, for example 80°; and
- to deactivate the presentation of the corresponding label, which is implemented by said means 15, when said angle $\alpha$ is (or becomes) greater than said predetermined value.

The invention claimed is:

1. A method of displaying at least one part of an airport comprising a plurality of elements on a display field of a viewing screen,
    wherein the following series of successive steps is carried out in an automatic and repetitive manner:
    a) conducting a search for the elements of the airport which are displayed on said display field of the viewing screen;
    b) for each of the elements found in step a), carrying out a check to verify whether it forms part:
        of a first group for which a main anchoring point, associated with the element and situated on the latter, lies inside a label zone which is defined inside said display field of the viewing screen; or
        of a second group, for which an associated main anchoring point is situated outside said label zone;
    c) for all the elements of the second group, determining each time an auxiliary anchoring point which is situated at an intersection point between a central axis of said element and said label zone; and
    d) for each of the elements found in step a), presenting on said display field of the viewing screen an associated label which comprises information relating to said element, the labels associated with said elements of the first group being situated at the corresponding main anchoring point, and the labels associated with said elements of the second group being situated at the corresponding auxiliary anchoring point.

2. The method as claimed in claim 1, wherein said main anchoring point is situated at the center of the corresponding element.

3. The method as claimed in claim 1, wherein, in the event of double intersection between the central axis of an element and the label zone, the intersection point which is situated longitudinally nearest the center of said element is determined as the auxiliary anchoring point.

4. The method as claimed in claim 1, wherein in step d), each label is presented horizontally.

5. A device for displaying at least one part of an airport comprising a plurality of elements on a display field of a viewing screen, the device comprising:
    a search section that searches for the elements of the airport which are displayed on said display field of the viewing screen;
    a verification section that verifies, for each of the elements found by said searching section, whether it forms part:
        of a first group for which a main anchoring point, associated with the element and situated on the latter, lies inside a label zone which is defined inside said display field of the viewing screen; or
        of a second group, for which an associated main anchoring point is situated outside said label zone;
    a determination section that determines each time, for all the elements of the second group, an auxiliary anchoring point which is situated at an intersection point between a central axis of said element and said label zone; and
    a presentation section that presents, on said display field of the viewing screen, an associated label which comprises information relating to said element, the labels associated with said elements of the first group being situated at the corresponding main anchoring point, and the labels associated with said elements of the second group being situated at the corresponding auxiliary anchoring point.

6. The device as claimed in claim 5, further comprising a deactivation section that deactivates the presentation of a label associated with an element, which is implemented by said presentation section, when the angle between the central axis of said element and the horizontal is greater than a predetermined value.

7. A display system comprising:
    a cartographic database of an airport;
    an actuator that allows an operator to control a plurality of functions of said display system; and
    a display device configured to display at feast one part of the airport on a viewing screen, wherein said display device is as specified under claim 5.

8. An aircraft, comprising a device configured to implement the method specified under claim 1.

9. An aircraft, comprising a device as specified under claim 5.

10. An aircraft, comprising a system as specified under claim 7.

11. A method of displaying at least one part of an airport comprising a plurality of elements on a display field of a viewing screen, wherein the following series of successive steps is carried out in an automatic and repetitive manner:

a) conducting a search for the elements of the airport which are displayed on said display field of the viewing screen;

b) for each of the elements found in step a), carrying out a check to verify whether it forms part:

of a first group for which a main anchoring point, associated with the element and situated on the latter, lies inside a label zone which is defined inside said display field of the viewing screen; or of a second group, for which an associated main anchoring point is situated outside said label zone;

c) for all the elements of the second group, determining each time an auxiliary anchoring point which is situated at an intersection point between a central axis of said element and said label zone;

d) for each of the elements found in step a), presenting on said display field of the viewing screen an associated label which comprises information relating to said element, the labels associated with said elements of the first group being situated at the corresponding main anchoring point, and the labels associated with said elements of the second group being situated at the corresponding auxiliary anchoring point; and e) if the angle between the central axis of an element and the horizontal is greater than a predetermined value, removing the presentation of the label corresponding to step d).

\* \* \* \* \*